United States Patent
Motoda

(10) Patent No.: US 7,087,137 B2
(45) Date of Patent: Aug. 8, 2006

(54) WELDING DEVICE

(75) Inventor: Shuho Motoda, Koshigaya (JP)

(73) Assignee: San-AI Industries, Inc., Saitama-pref (JP)

( * ) Notice: Subject to any disclaimer, the term of this patent is extended or adjusted under 35 U.S.C. 154(b) by 0 days.

(21) Appl. No.: 11/133,314

(22) Filed: May 20, 2005

(65) Prior Publication Data

US 2005/0257895 A1    Nov. 24, 2005

(30) Foreign Application Priority Data

May 20, 2004    (JP) .............................. 2004-149867

(51) Int. Cl.
    *B32B 37/00*    (2006.01)
(52) U.S. Cl. ................. 156/580.2; 156/579; 156/580.1
(58) Field of Classification Search .............. 156/73.1, 156/579, 580.1, 580.2; 264/442, 443, 444, 264/445; 425/174.2; 228/110.1, 1.1
    See application file for complete search history.

(56) References Cited

U.S. PATENT DOCUMENTS 4,265,687 A  *  5/1981   Mercer et al. ............. 156/73.1
4,871,414 A  * 10/1989   Niedrig ...................... 156/494

* cited by examiner

*Primary Examiner*—James Sells
(74) *Attorney, Agent, or Firm*—Young & Thompson

(57) ABSTRACT

A welding device comprising a body having a cylindrical portion and an integral gripping portion extending away from the cylindrical portion. A welding head is provided at one end of the cylindrical portion. The welding head is angularly displaceable relative to the cylindrical portion about the longitudinal axis of the cylindrical portion and supports an ultrasonic transducer and an anvil co-operable with the transducer. The transducer and anvil are relatively movable towards one another to pinch an object to be welded therebetween. A pulling device operable by a trigger is provided for pulling the transducer and the anvil towards one another and a battery pack is releasably attached to the gripping portion.

13 Claims, 4 Drawing Sheets

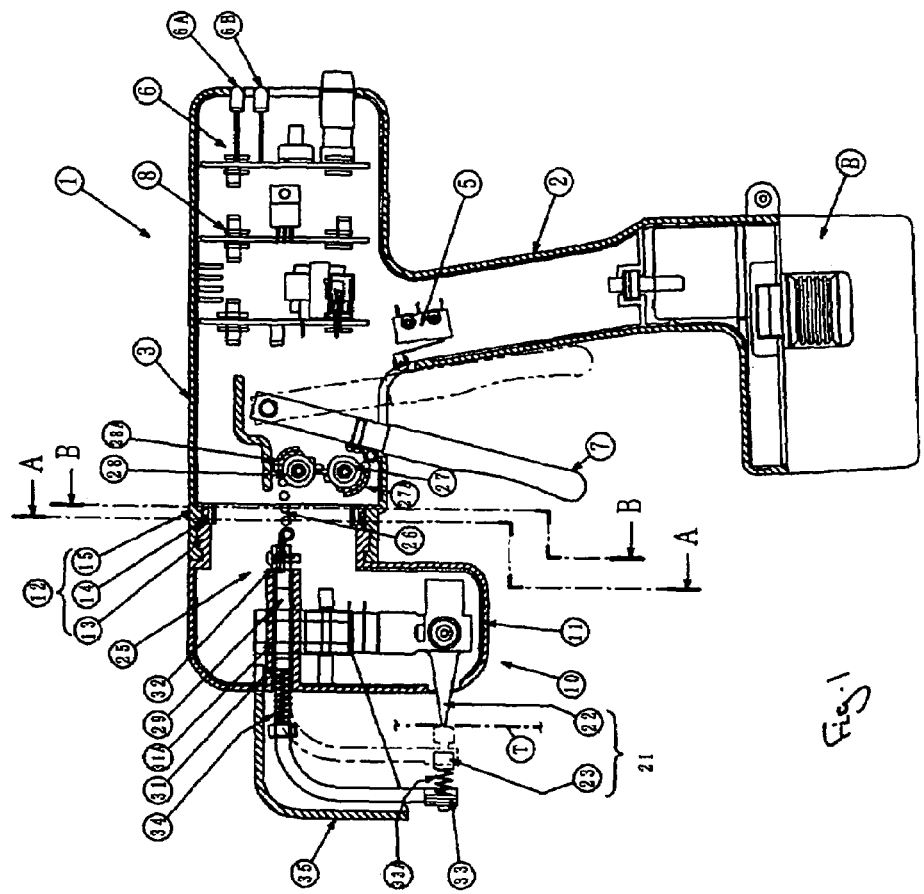
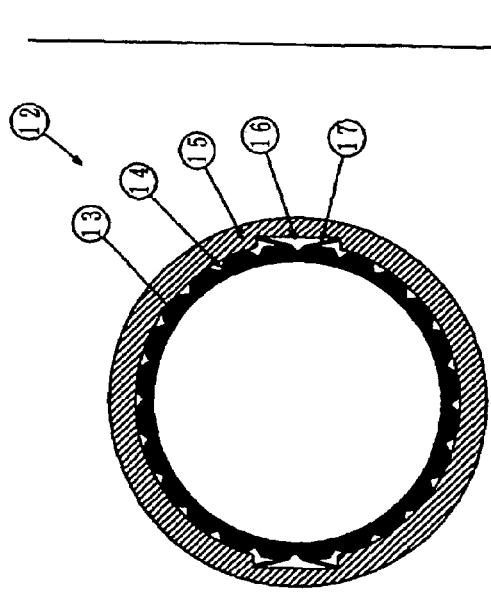
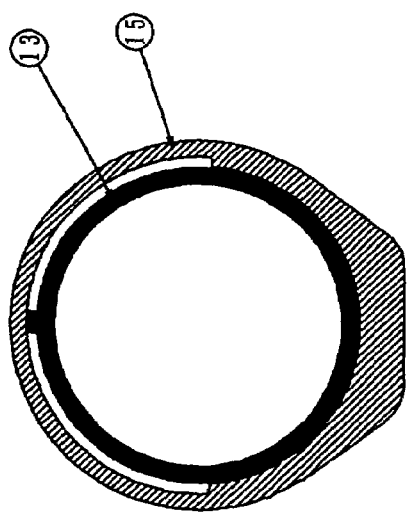
[Figure 4A]
[Figure 4B]

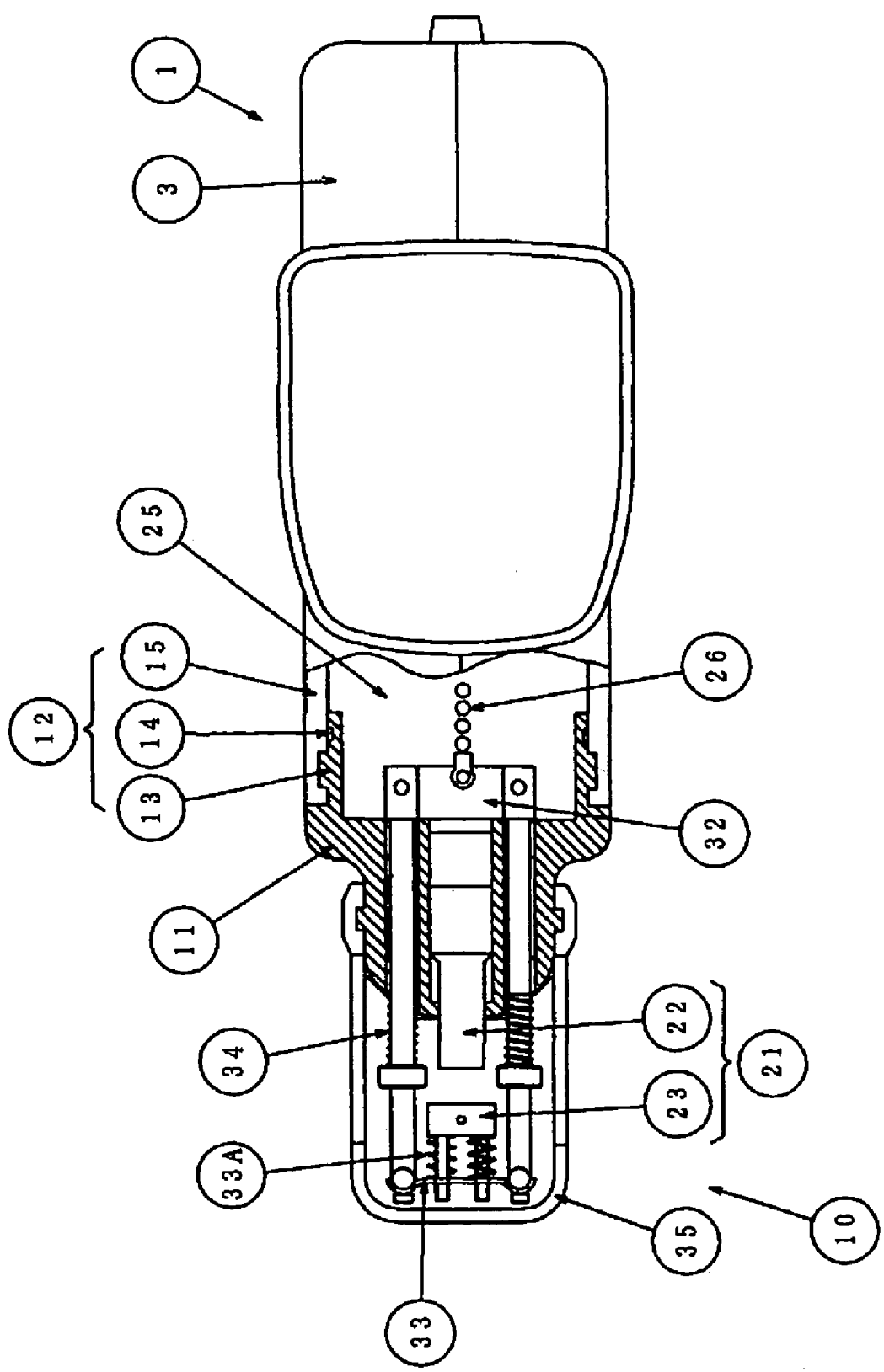
[Figure 2]

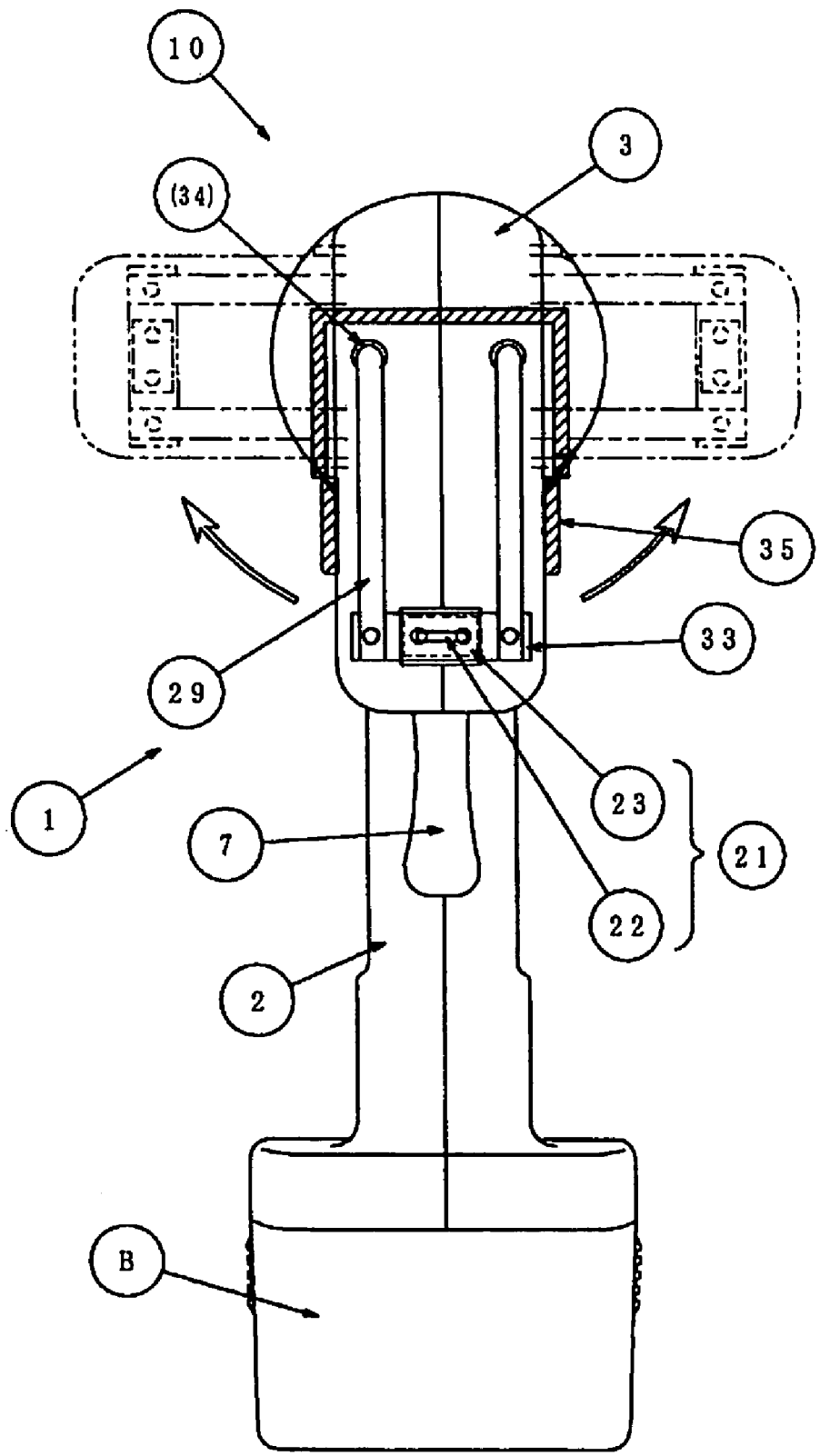
[Figure 3]

[Figure 5]
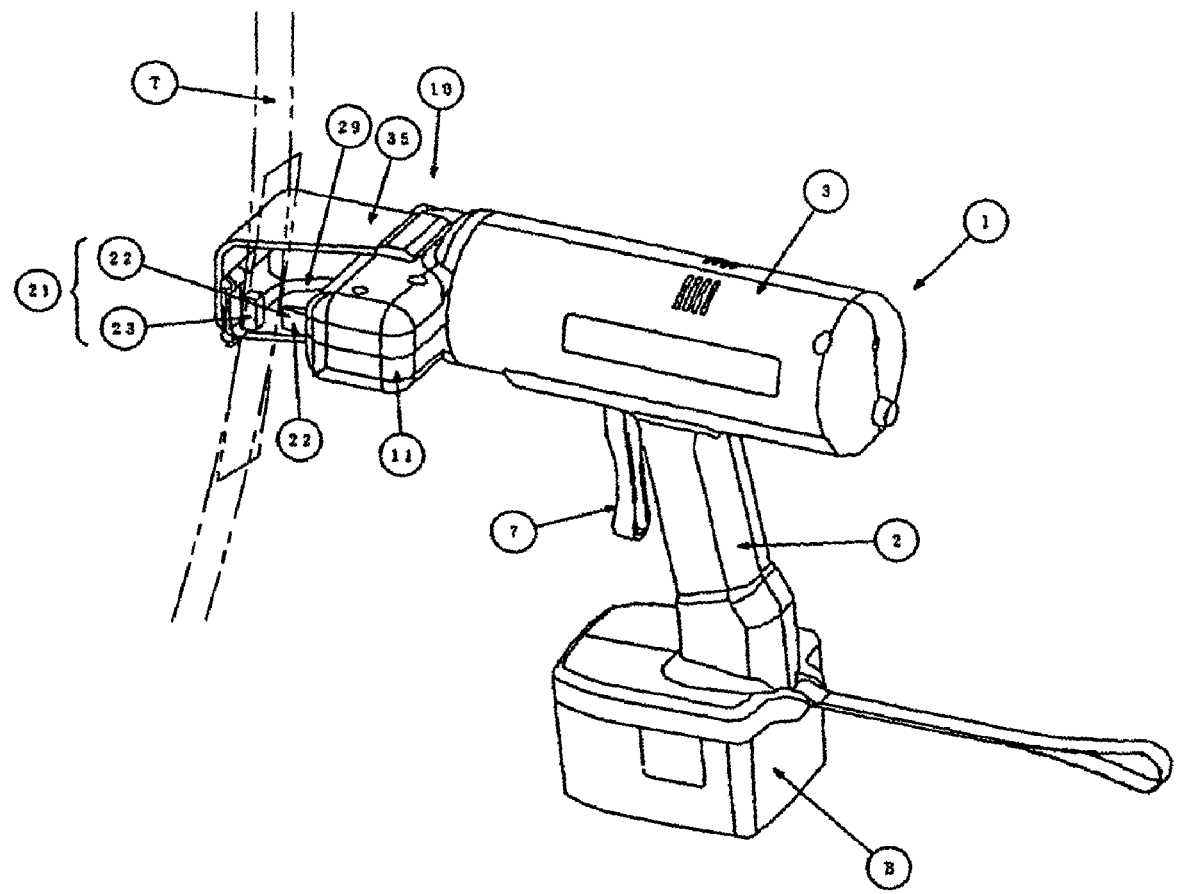

WELDING DEVICE

BACKGROUND OF THE INVENTION

This invention relates to a portable welding device, and more particularly but not exclusively, to such a welding device for welding guide tapes used in conveying large items of laundry, such as bedsheets, to be ironed on the roll of a flat work ironer in a laundry. It could, however, be used to weld other objects together.

Guide tapes used as described above wear out and eventually break. These have to be replaced. To do this, the guide tape is sent along the length of the laundry and then both ends are manually knotted or welded together.

It is known to use an ultrasonic welding tool for this purpose. However, conventional welding tools require the use of mains electricity. This can prove extremely inconvenient in a laundry factory where a flat work ironer is a fairly large piece of equipment.

Also, conventional welding tools suffer from damage caused by the oscillating power of the welding transducer (typically at about 60,000 cycles per second), particularly when no object to be welded is present in the work station of the welding device. Also, they are not versatile and are not designed for use by both right handed and left handed persons.

SUMMARY OF THE INVENTION

According to the present invention there is provided a welding device comprising a body having a cylindrical portion and a gripping portion extending away from the cylindrical portion, a welding head at one end of the cylindrical portion, the welding head being angularly displaceable relative to the cylindrical portion about the longitudinal axis of the cylindrical portion and supporting an ultrasonic transducer and an anvil co-operable with the transducer, the transducer and anvil being relatively movable towards one another to pinch an object to be welded therebetween, a pulling device for pulling the transducer and the anvil towards one another and a battery pack releasably attached to the gripping portion.

The invention will now be more particularly described, by way of example, with reference to the accompanying drawings.

BRIEF DESCRIPTION OF THE DRAWINGS

FIG. 1 is a sectional side view of one embodiment of a welding device, according to the present invention, FIG. 2 is a partly cut away plan view of the welding device shown in FIG. 1, FIG. 3 is a cross-sectional elevational view of the welding device shown in FIGS. 1 and 2, FIG. 4a is a section through the click operable detent mechanism of the welding device, taken along line A—A in FIG. 1, FIG. 4b is a section through the click operable detent mechanism of the welding device, taken along line B—B in FIG. 1, and FIG. 5 is a perspective view of the welding device in use.

DESCRIPTION OF THE PREFERRED EMBODIMENT

Referring to the drawings, the welding tool shown therein is particularly suitable for welding guide tapes of a flat work ironer or ironing machine which tapes may be made of woven synthetic heat melted fibre tape. However, it could be used to weld other thermoplastic objects together.

The welding device comprises a body 1 having a cylindrical portion 3 and gripping portion 2 extending downwardly away from the cylindrical portion 3. A welding head 10 is mounted at the front end of the cylindrical portion 3. The welding head 10 comprises a housing 11 having a boss or sleeve portion, which is mounted for angular displacement in the end of the cylindrical portion 3 about the longitudinal axis of the cylindrical portion 3.

The welding head 10 has a welding section 21 comprising an ultrasonic transducer 22 which is fixed to the welding head 10 and an anvil 23 which is supported by a slider reciprocally movable in the welding head 10. Typically, the tip of the transducer 22 may be 1 mm by 10 mm and the anvil 23 may be 4 mm by 12 mm.

The anvil 23 is movable towards the transducer 22 by a pulling device 25 operating on the aforesaid slider.

A battery pack B, preferably a rechargeable battery pack, is releasably attached to the lower end of the gripping portion 2 of the body 1.

A power supply circuit unit 6 is mounted in the rear end of the cylindrical portion 2 for supplying power to the transducer 22.

The aforesaid slider comprises two parallel L-shaped arms 29 connected together by coupling plates 32, 33. The longer limbs of the arms 29 are guided in respective guide holes 31, lined with low friction sleeves 31a, in the housing portion 11 of the welding head 10.

The pulling device 25 comprises a trigger 7 mounted for pivotable movement within the cylindrical section 3 of the body 1 and extending outwardly through an opening at the junction of the cylindrical portion 3 and gripping portion 2 of the body 1. The pulling device 25 also comprises a flexible elongate element in the form of a ball chain 26 connected between the inner end of the slider and the trigger 7. The ball chain 26 is attached to the coupling plate 32 of the slider at a point coincident with the axis of angular displacement of the welding head 10 relative to the body 1 and is guided over pulleys 27 and 28 to a position offset from said axis where it is connected to the trigger 7.

The pulleys 27 and 28 have conventional V-shaped or concave outer surfaces to prevent the ball chain 26 being displaced laterally relative to the pulleys 27 and 28 and arcuate pulling guides 27a and 28a are provided adjacent the respective pulleys 27 and 28 to prevent the ball chain 26 from coming out of the V-shape grooves in the outer pulley surfaces.

A power switch 5 is provided in the upper end of the gripping portion and this is co-operable with the trigger 7 so that, when the trigger is pulled, power is supplied from the power supply circuit unit 6 to the transducer 22.

The anvil 23 can be drawn towards the transducer 22 in order to pinch an object T to be welded therebetween by pulling on the trigger 7. A compression spring 34 is provided to return the slider and anvil 23 to their original positions when the trigger 7 is released. The anvil 23 is resiliently supported by the coupling plate 33 with springs 33a providing a limited degree of slidable movement of the anvil 23 towards and away from the coupling plate 33 in order to automatically adjust the pressure applied to the object to be welded T when the object is held between the transducer 22 and the anvil 23.

It also enables an operator to weld object T under a constant pressure regardless of the operator's grip.

A click operable detent mechanism 12 is provided between the welding head 10 and the cylindrical portion 3 of the body 1 to selectively hold the welding head 10 in any one of a plurality of angular positions relative to the cylindrical portion 3. The detent mechanism 12 is best shown in FIGS. 4a and 4b. This comprises a wheel 13 which forms part of the welding head 10 and a cylindrical holder 15 which forms part of the cylindrical portion 3 of the body 1.

The wheel 13 is provided with a plurality of angularly spaced grooves or notches 14 of V-shaped cross-section and these co-operate with two resilient detent elements in the form of detent springs 17 located in respective diametrically opposite recesses 16 provided in the holder 15. This click operable detent mechanism 12 allows the welding head 10 to be selectively held in any one of a plurality of angular positions relative to the cylindrical portion 3 and this makes the tool much more versatile both in the manner it is held and whether by left or right-handed operators.

It can be set at an appropriate angle to meet an operator's position.

The detent mechanism 12 only allows the welding head 10 to be displaced angularly through 180°, as best illustrated in FIG. 3, to prevent undesirable twist of the ball chain 26.

The power supply circuit unit 6 comprises three circuit boards housed in the rear of the cylindrical portion 3 of the body 1 and held in resilient holders 8. The circuit boards may be surrounded by soft resilient material such as rubber to soften any external shocks caused, for example, by dropping the welding device.

Warning light 6a is provided to illuminate in response to a sensor, which detects when the transducer 22 and anvil 23 make direct contact and warning light 6b alerts an operator of a low battery condition. The sensor also cuts off the power supply to the transducer 22. A cover 35 extends partly around the slider to protect the slider from external shock and eventual deformation and to protect the welding section 21 from breakage or deformation should the tool be dropped or knocked against something by an operator.

It is thus possible to provide a portable welding machine, which is versatile and does not require an electrical cable.

The embodiment described above is given by way of example only and various modifications will be apparent to persons skilled in the art without departing from the scope of the invention as defined in the appended claims.

For example, the anvil 23 could be fixed to the welding head 10 and the transducer 22 could be supported by the slider. Also, the detent mechanism 12 may have only one resilient detent element 17. The welding head 10 may be positionable upwards relative to the cylindrical portion 3, instead of downwards as shown in FIG. 3, thus still allowing 180° of angular displacement or rotation.

What is claimed is:

1. A welding device comprising a body having a cylindrical portion and a gripping portion extending away from the cylindrical portion, a welding head at one end of the cylindrical portion, the welding head being angularly displaceable relative to the cylindrical portion about the longitudinal axis of the cylindrical portion and supporting an ultrasonic transducer and an anvil co-operable with the transducer, the transducer and anvil being relatively movable towards one another to pinch an object to be welded therebetween, a pulling device for pulling the transducer and the anvil towards one another and a battery pack releasably attached to the gripping portion.

2. A welding device as claimed in claim 1, wherein one of the transducer and the anvil is fixed to the welding head and supported by a slider reciprocally movable in the welding head by the pulling device in a direction parallel to the axis of angular displacement of the welding head relative to the cylindrical portion.

3. A welding device as claimed in claim 2, wherein the slider comprises two parallel arms joined at opposite ends and guided intermediate their ends in respective holes provided in the welding head for the aforesaid slidable movement.

4. A welding device as claimed in claim 2, wherein the slider is urged by spring means in a direction opposite to the pulling direction of the pulling device.

5. A welding device as claimed in claim 4, wherein further spring means act between the slider and one of the anvil and the transducer to bias the one of the anvil and the transducer towards the other of the anvil and the transducer.

6. A welding tool as claimed in claim 1, wherein the pulling device includes a trigger and a flexible elongate element connected between the slider and the trigger.

7. A welding device as claimed in claim 6, wherein the flexible elongate element is a ball chain.

8. A welding device as claimed in claim 6, wherein the flexible elongate element is connected to the slider at a point coincident with the axis of angular displacement of the welding head relative to the cylindrical portion and is guided over pulleys to a position offset from said axis where it is connected to the trigger.

9. A welding device as claimed in claim 6, wherein the trigger co-operates with an on-off switch to supply power to the ultrasonic transducer.

10. A welding device as claimed in claim 1, wherein a click operable detent mechanism is provided between the welding head and the cylindrical portion of the body to selectively hold the welding head in any one of a plurality of angular positions relative to the cylindrical portion.

11. A welding device as claimed in claim 10, wherein the detent mechanism comprises a plurality of angularly spaced detent grooves or notches in the welding head and at least one resilient detent element supported by the cylindrical portion for selective co-operation with the grooves or notches.

12. A welding device as claimed in claim 1, wherein the welding head is angularly displaceable relative to the cylindrical portion through only 180° or substantially 180°.

13. A welding device comprising:
   a body portion and a gripping portion attached to said body portion;
   a welding head at one end of said body portion, said welding head being arranged and adapted to be angularly displaceable relative to said body portion about a longitudinal axis of said body portion, said welding head supporting an ultrasonic transducer and an anvil that cooperates with said transducer;
   a pulling device that causes at least one of said transducer and said anvil to move towards the other of said transducer and said anvil to pinch an object to be welded; and
   a battery pack at one of said body portion and said gripping portion.

* * * * *